United States Patent
Kakiuchi

(10) Patent No.: US 7,452,103 B2
(45) Date of Patent: Nov. 18, 2008

(54) ILLUMINATING DEVICE FOR PHOTOSHOOTING

(75) Inventor: Shinichi Kakiuchi, Saitama-ken (JP)

(73) Assignee: HOYA Corporation, Tokyo (JP)

( * ) Notice: Subject to any disclaimer, the term of this patent is extended or adjusted under 35 U.S.C. 154(b) by 126 days.

(21) Appl. No.: 11/097,349

(22) Filed: Apr. 4, 2005

(65) Prior Publication Data

US 2005/0219834 A1   Oct. 6, 2005

(30) Foreign Application Priority Data

Apr. 5, 2004 (JP) .............................. 2004-110984

(51) Int. Cl.
 *F21V 1/00* (2006.01)
(52) U.S. Cl. ................... 362/248; 362/231; 362/235; 362/237; 362/240; 362/246; 362/252
(58) Field of Classification Search .............. 362/231, 362/235, 237, 240, 246, 248, 252, 545, 800; 257/99; 313/500, 505
See application file for complete search history.

(56) References Cited

U.S. PATENT DOCUMENTS

| 5,990,498 | A  | * | 11/1999 | Chapnik et al. ............... 257/99 |
| 6,527,410 | B2 | * | 3/2003  | Yamaguchi .................. 362/243 |
| 6,588,923 | B1 | * | 7/2003  | Shih ............................. 362/487 |
| 2005/0073760 | A1 |   | 4/2005 | Kakiuchi et al. |

FOREIGN PATENT DOCUMENTS

| CN | 2172879 | 7/1994 |
| JP | 5-55632 | 3/1993 |
| JP | 5-131681 | 5/1993 |
| JP | 11-121808 | 4/1999 |
| JP | 2001-215579 | 8/2001 |

OTHER PUBLICATIONS

U.S. Appl. No. 10/980,284 to Seo et al., filed Nov. 4, 2004.
U.S. Appl. No. 11/001,042 to Ogawa et al., filed Dec. 2, 2004.
English Language Abstract of JP 5-55632.
English Language Abstract of JP 5-131681.
English Language Abstract of JP 11-121808.
English Language Abstract of JP 2001-215579.

* cited by examiner

*Primary Examiner*—Stephen F. Husar
*Assistant Examiner*—Meghan K. Dunwiddie
(74) *Attorney, Agent, or Firm*—Greenblum & Bernstein, P.L.C.

(57) ABSTRACT

An illuminating device which is provided with a plurality of light source units is provided. Each of the plurality of light source units includes a light emitting unit having a light emitting device, a first optical system that adjusts an optical path of light emitted from the light emitting unit, an electrode that supplies power to the light emitting unit, and a connecting element that connects the light emitting unit to the electrode and is disposed so as to block a part of the optical path of light from the light emitting unit thus to create an unilluminated area. In this structure, the plurality of light source units are arranged such that unilluminated areas of the plurality of light source units are substantially uniformly distributed over an entirety of an area illuminated by all the plurality of light source units.

16 Claims, 8 Drawing Sheets

ILLUMINATING DEVICE FOR PHOTOSHOOTING

BACKGROUND OF THE INVENTION

The present invention relates to an illuminating device that emits illuminating light, to be used for a photoshooting apparatus such as a digital camera or a mobile apparatus with a camera function.

The recent progress in sensitivity of silver-halide films and of CCD image pickup devices has significantly decreased the demand for a large amount of light from illuminating devices used for photoshooting. Under such trend, for example the Japanese patent provisional publication No.2001-215579 has proposed an illuminating device for photoshooting that utilizes a semiconductor light emitting device as a light source, which offers luminous efficiency upgraded by far, though the amount of light is smaller when compared with an existing illuminating device utilizing a xenon tube, thereby contributing in reducing the power consumption and extending the life span of the illuminating device.

The semiconductor light emitting device requires a light emitting unit and an electrode for supplying power to the light emitting unit. Generally the light emitting unit and the electrode are electrically connected via a wire, and the power-supply wire is located on an optical path of the light emitted by the light emitting unit. Accordingly, a portion of the light from the light emitting unit is blocked by the wire, which results in uneven illumination on the illuminated area.

SUMMARY OF THE INVENTION

The present invention is advantageous in that it provides an illuminating device capable of providing a uniform brightness over an entirety of an illuminated area, even if a light source unit including a general-purpose semiconductor light emitting device in which a wire is disposed so as to block a portion of the emitted light is used in the illuminating device.

According to an aspect of the invention, there is provided an illuminating device which is provided with a plurality of light source units. Each of the plurality of light source units includes a light emitting unit having a light emitting device, a first optical system that adjusts an optical path of light emitted from the light emitting unit, an electrode that supplies power to the light emitting unit, and a connecting element that connects the light emitting unit to the electrode and is disposed so as to block a part of the optical path of light from the light emitting unit thus to create an unilluminated area. In this structure, the plurality of light source units are arranged such that unilluminated areas of the plurality of light source units are substantially uniformly distributed over an entirety of an area illuminated by all the plurality of light source units.

With this configuration, it is possible to uniformly illuminate the entire area illuminated by the illuminating device.

In a particular case, the light emitting unit may be provided with a light-emitting surface including a substantially rectangular shaded region created by the connecting element blocking the light. Light emitting units of the plurality of light source units may have substantially the same shape and may be arranged in parallel with a horizontal direction in four rows including first, second third and fourth rows. In the first row, the light source units may be arranged such that all of the shaded regions are located in upper portions thereof. In the second row, the light source units may be arranged such that all of the shaded regions are located in lower portions thereof and at regular intervals from one another, and at least one of the shaded regions in the second row is located right under a center between adjacent shaded regions of the first row. In the third row, the light source units may be arranged such that all of the shaded regions are located in upper portions thereof and at regular intervals from one another, and at least one of the shaded regions in the third row is located right under a center between adjacent shaded regions of the second row. In the fourth row, the light source units may be arranged such that all of the shaded regions are located in lower portions thereof, and right under the shaded regions of the first row.

In a particular case, the plurality of light source units may be divided into at least one light source group including three light source units of an identical shape. The light emitting unit may be provided with a light-emitting surface including a substantially rectangular shaded region created by the connecting element blocking the light. Center points of light-emitting surfaces of the plurality of light source units may be located within shaded regions of the respective light-emitting surfaces. The three light source units in the at least one light source group may be arranged such that short sides of an outline of a first shaded region are generally aligned with short sides of an outline of a second shaded region, a long side of the outline of the first shaded region opposite to the second shaded region is substantially aligned with a first short side of an outline of the third shaded region, and an extension of a second short side of the outline of the third shaded region passes a center point between the first shaded region and the second shaded region.

In a particular case, the plurality of light source units may be divided into at least one light source group including five light source units of an identical shape and forming a light emitting section. The light emitting unit may be provided with a light-emitting surface including a substantially rectangular shaded region created by the connecting element blocking the light. Center points of light-emitting surfaces of the plurality of light source units may be located within shaded regions of the respective light-emitting surfaces. The five light source units in the at least one light source group may be arranged:

such that a first shaded region is located generally at a center of the light emitting section, and second, third, fourth and fifth shaded regions are located around the first shaded region;

such that long sides of an outline of a second shaded region are substantially parallel to long sides of an outline of the first shaded region;

such that short sides of the outline of the second shaded region are substantially aligned with short sides of an outline of the third shaded region;

such that long sides of an outline of the fourth shaded region are substantially aligned with long sides of the outline of the third shaded region;

such that a long side of an outline of the fifth shaded region closer to the center of the light emitting section is substantially aligned with a short side of the outline of the fourth shaded region closer to the center of the light emitting section; and such that a short side of the outline of the fifth shaded region farther from the center of the light emitting section is substantially aligned with a long side of the outline of the second shaded region farther from the center of the light emitting section.

In a particular case, the plurality of light source units may be divided into at least one light source group including four light source units of an identical shape and forming a light emitting section. The light emitting unit may be provided with a light-emitting surface including a substantially rectangular shaded region created by the connecting element blocking the light. Center points of light-emitting surfaces of the plurality of light source units may be located within shaded regions of the respective light-emitting surfaces. The four light source units in the at least one light source group may be arranged:

such that short sides of an outline of a first shaded region are substantially aligned with short sides of an outline of a second shaded region;

such that long sides of an outline of a third shaded region are substantially parallel to long sides of the outline the first shaded region, and a center of the third shaded region falls on a straight line that passes a center point between the first shaded region and the second shaded region substantially in parallel to a long side of the outline of the first shaded region; and such that a first short side of an outline of a fourth shaded region falls on a straight line that passes a center point between the second shaded region and the third shaded region substantially in parallel to long sides of the outline of the second shaded region, and a second short side of the outline of the fourth shaded region is substantially aligned with a long side of the outline of the second shaded region.

Optionally, the at least one light source group may include a plurality of the light source groups.

Still optionally, the first optical system may serve as an optical path diffuser that diffuses the light from the light emitting unit.

Still optionally, the optical path diffuser may be made of light-transmitting resin, placed so as to cover the light emitting unit.

Still optionally, the connecting element may be a wire for supplying power from the electrode to the light emitting unit.

Still optionally, the illuminating device may include a second optical system that simultaneously adjusts optical paths of light emitted by all of the plurality of light source units.

Still optionally, the second optical system may include a projection lens.

Still optionally, the light emitting device may be a semiconductor light emitting device.

BRIEF DESCRIPTION OF THE ACCOMPANYING DRAWINGS

DETAILED DESCRIPTION OF THE EMBODIMENTS

Figure 1:
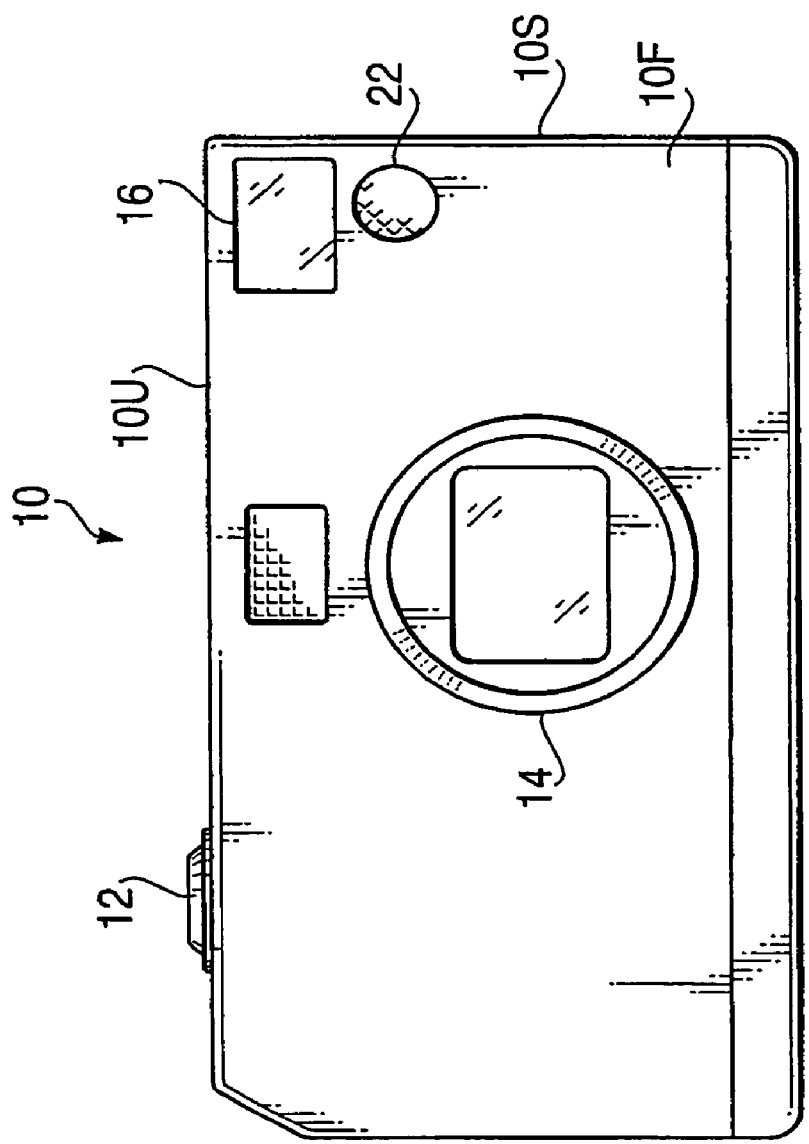
FIG. 1 is a front view showing a digital camera in which an illuminating device according to the present invention is incorporated for photoshooting.

Referring to the accompanying drawings, embodiments of the present invention will be described hereunder. FIG. 1 is a front view showing a digital camera in which an illuminating device according to the present invention is incorporated for photoshooting.

A digital camera 10 is provided with a release button 12 on the upper face 10U thereof, and a photoshooting optical system 14, photometer 22 and illuminating device 16 on the front face 10F thereof. The illuminating device 16 is located close to a corner where the upper face 10U and a lateral face 10S of the digital camera 10 meet, and includes a plurality of light source units 15 (see FIG. 5), in which a white LED (light emitting device) is provided as a light source. The illuminating device 16 serves to illuminate an object according to a luminance of the object detected by the photometer 22.

Figure 2:
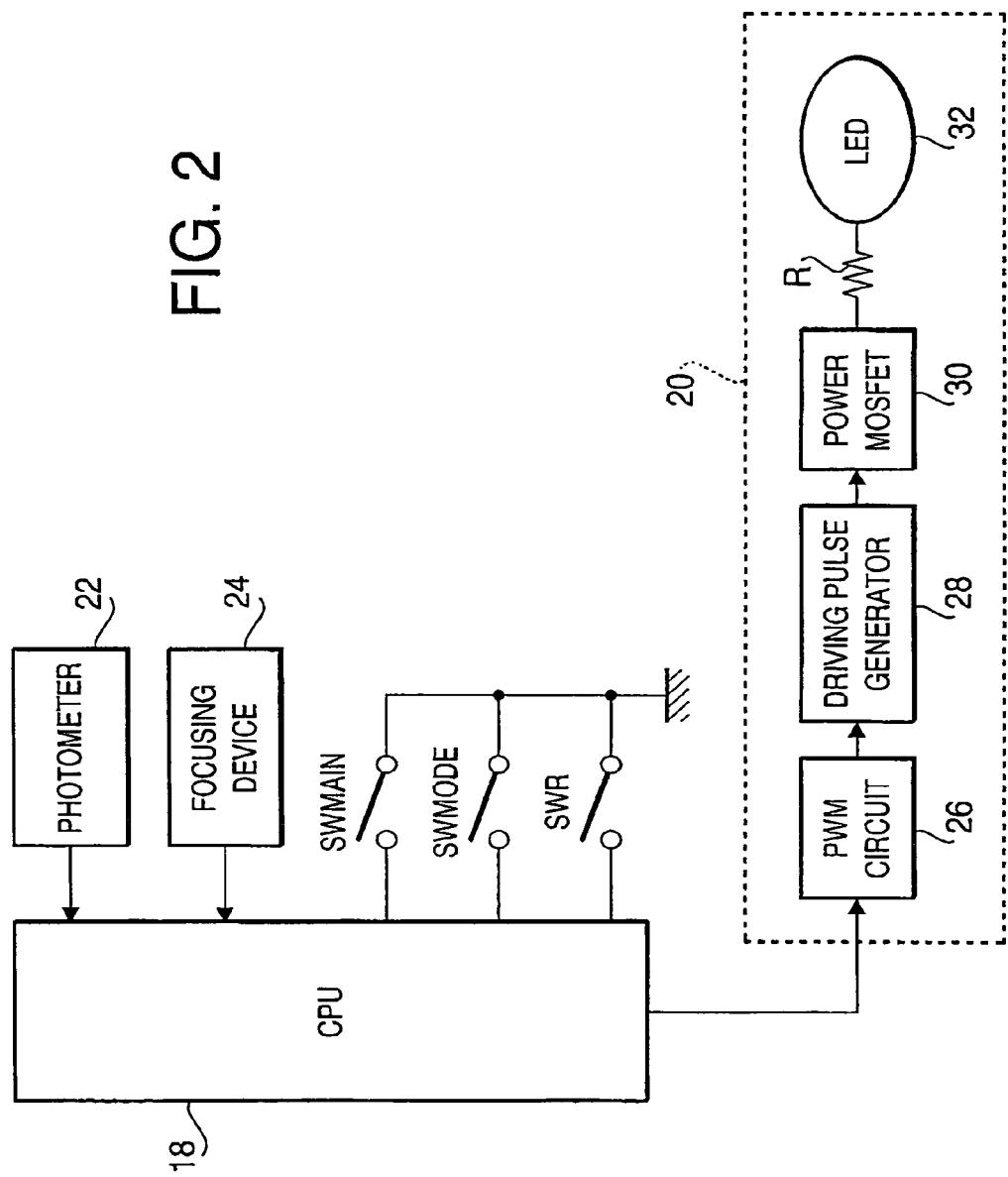
FIG. 2 is a block diagram showing an inner structure of the digital camera.

FIG. 2 is a block diagram showing an inner structure of the digital camera 10.

A CPU 18 controls various components of the digital camera 10. The CPU 18 is connected with a main switch SWMAIN and a mode setting switch SWMODE. The main switch SWMAIN is a main switch (not shown) for the digital camera 10, which activates the CPU 18 when manipulated by a user. The mode setting switch SWMODE is a jog dial (not shown) provided on a surface of the digital camera 10. Rotating the jog dial to a predetermined position causes a signal representing a mode such as a photoshooting mode, exposure setting mode or replay mode, to be transmitted to the CPU 18. Accordingly a mode selected by the user is set, and the photoshooting mode will be hereunder referred to, for the description purpose.

A photometric switch (not shown) connected to the CPU 18 is turned on when the release button 12 is pressed halfway, and the photometer 22 measures the luminance and a focusing device 24 measures the distance, with respect to the object. The photometric data and focusing data thus acquired are transmitted to the CPU 18.

When the release button 12 is completely pressed so as to turn on a release switch SWR, the CPU 18 outputs a control signal that causes a shutter (not shown) to open up to a predetermined aperture for a predetermined duration of time, according to the specified exposure, thus to expose a charge-coupled device (CCD, not shown).

In the case where the user has selected the illuminating mode for the photoshooting, the CPU 18 determines an amount of light to be provided by the illuminating device 16 according to the luminance data and focusing data of the object just acquired, and transmits a signal to control the light emission of an LED 32 included in the illuminating device 16, to a flash circuit 20.

The flash circuit 20 includes a PWM circuit 26, a driving pulse generator 28, a power MOSFET 30 and the LED 32. The control signal that controls the light emission of the LED 32 is input by the CPU 18 to the PWM circuit 26. The control signal causes the PWM circuit 26 to generate a pulse signal having a desired duty ratio, as well as a predetermined pulse width and frequency. The pulse signal is input to the driving pulse generator 28. The driving pulse generator 28 shapes the voltage of the pulse signal into predetermined values suitable for driving the LED 32, and outputs the shaped signal as a driving signal. The driving signal output by the driving pulse generator 28 is output to the LED 32 via the power MOSFET 30 and a resistance R. The driving signal drives the LED 32, so as to emit light.

Figure 3:
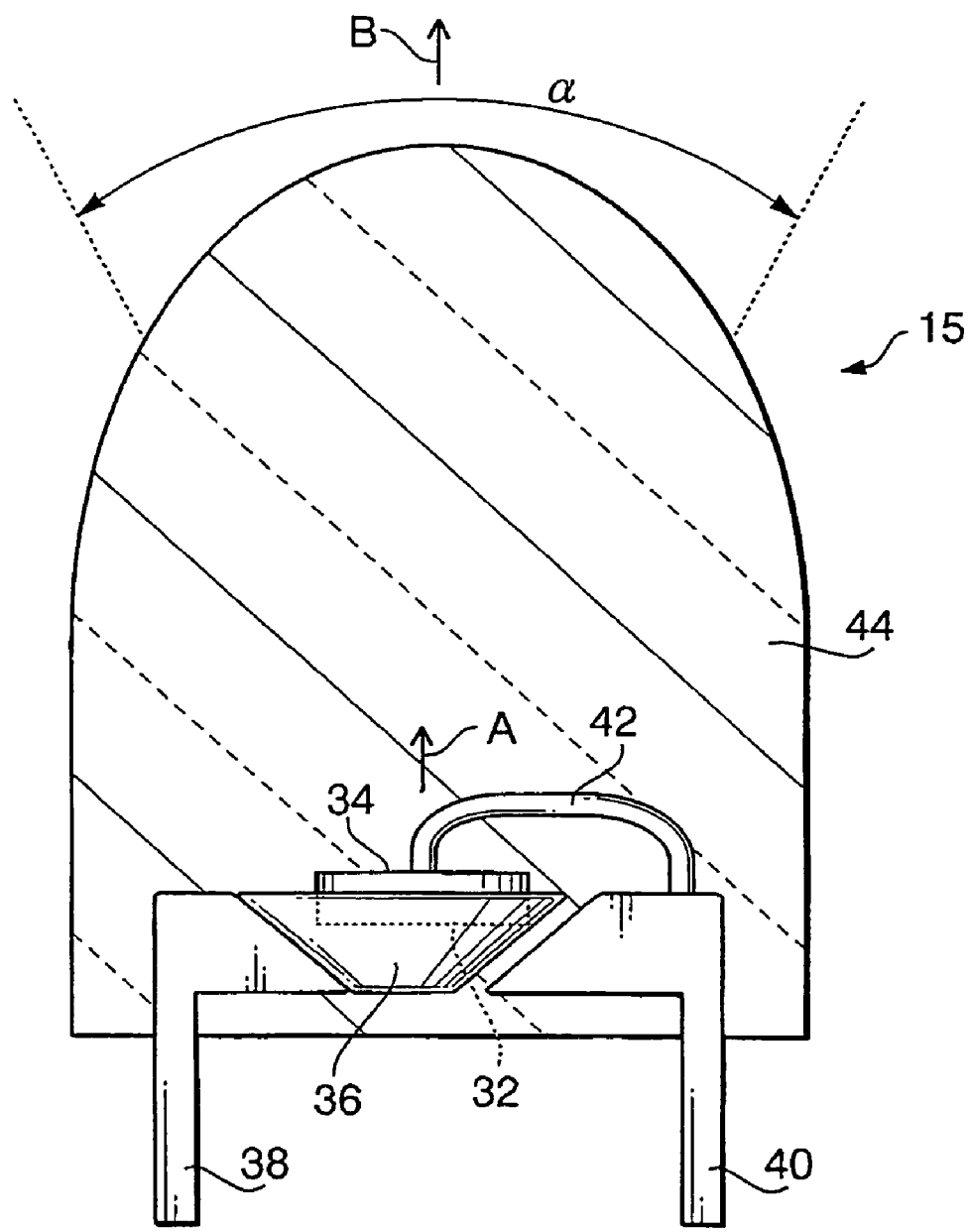
FIG. 3 is an illustration schematically showing a light source unit.

FIG. 3 is an illustration schematically showing a light source unit 15 provided in the illuminating device 16.

The light source unit 15 includes the LED 32, a rectangular light-emitting surface 34 and an LED base 36. The LED 32 is buried in the LED base 36, and emits white light when an anode 40 supplies power thereto. The white light is emitted through the light-emitting surface 34 in a vertical direction with respect to the light-emitting surface 34. The LED base 36 and the light-emitting surface 34 are covered with a light transmitting resin 44, which is transparent and hence allows light to pass therethrough. The light transmitting resin 44 not only protects the light-emitting surface 34 and so on but also serves as a lens that diffuses an optical path of the emitted light. Accordingly, when the light A vertically emitted from the light-emitting surface 34 passes through the light transmitting resin 44 to be thereby emitted out of the light source unit 15 as illuminating light B, the illuminating light B has a predetermined illumination angle α.

The LED 32 is electrically connected to a cathode 38 via the LED base 36, and to the anode 40 via the light-emitting surface 34 and a wire 42. An end portion of the wire 42 is penetrating through the center of the light-emitting surface 34. Since a portion of the emitted light A is blocked by the wire 42, an unilluminated area in which a shadow of the wire 42 is cast is formed in a portion of an area to be illuminated by the illuminating light B. When an image of the light source (the light source unit 15) is cast through an optical system on a project plane, the unilluminated area appears on the projection plane as a relatively dark area, which causes uneven illumination on the projection plane.

Figure 4:
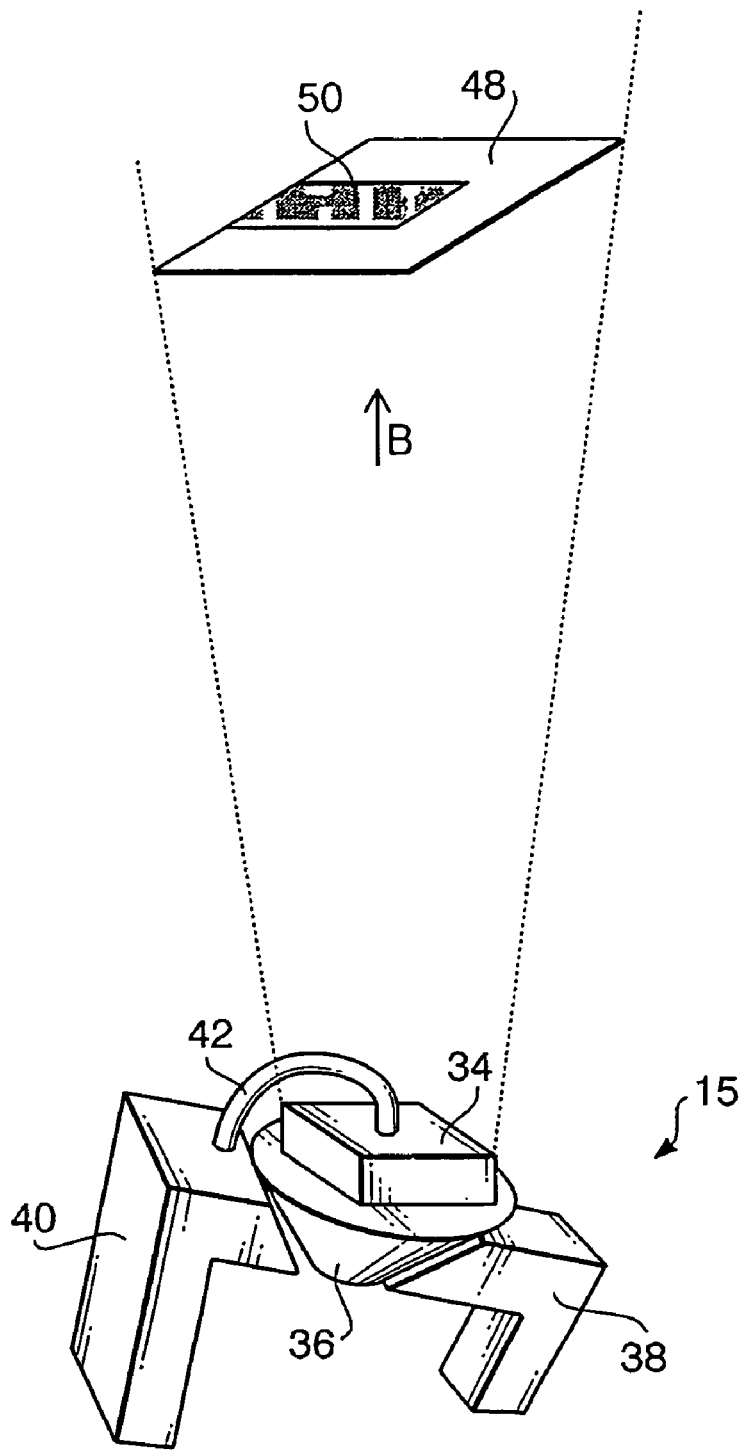
FIG. 4 is an illustration for explaining an unilluminated area.

FIG. 4 is an illustration for explaining the unilluminated area.

Though the illuminating light B from the light source unit 15 illuminates an area 48, an unilluminated area 50 is created because the wire 42 blocks the illuminating light B. To be more detailed, since the wire 42 blocks a section of the illuminating light B from a central portion of the light-emitting surface 34 toward a central portion of a side of the outline of the light-emitting surface 34, the unilluminated area 50 is created in a section from a central portion of the illuminated area 48 toward a central portion of one of the sides constituting the outline of the illuminated area 48. Here, the optical path of the illuminating light B is diffused in an illumination angle α upon passing through the light transmitting resin 44 (not shown in FIG. 4), and therefore a boundary between the illuminated area and the unilluminated area, or an outline thereof cannot be clearly defined. However, for the sake of explicitness of the description, such boundary or outline is illustrated as if it were a clearly defined line in the drawings.

Hereafter, four embodiments of the illuminating device 16 will be described.

First Embodiment

Figure 5:
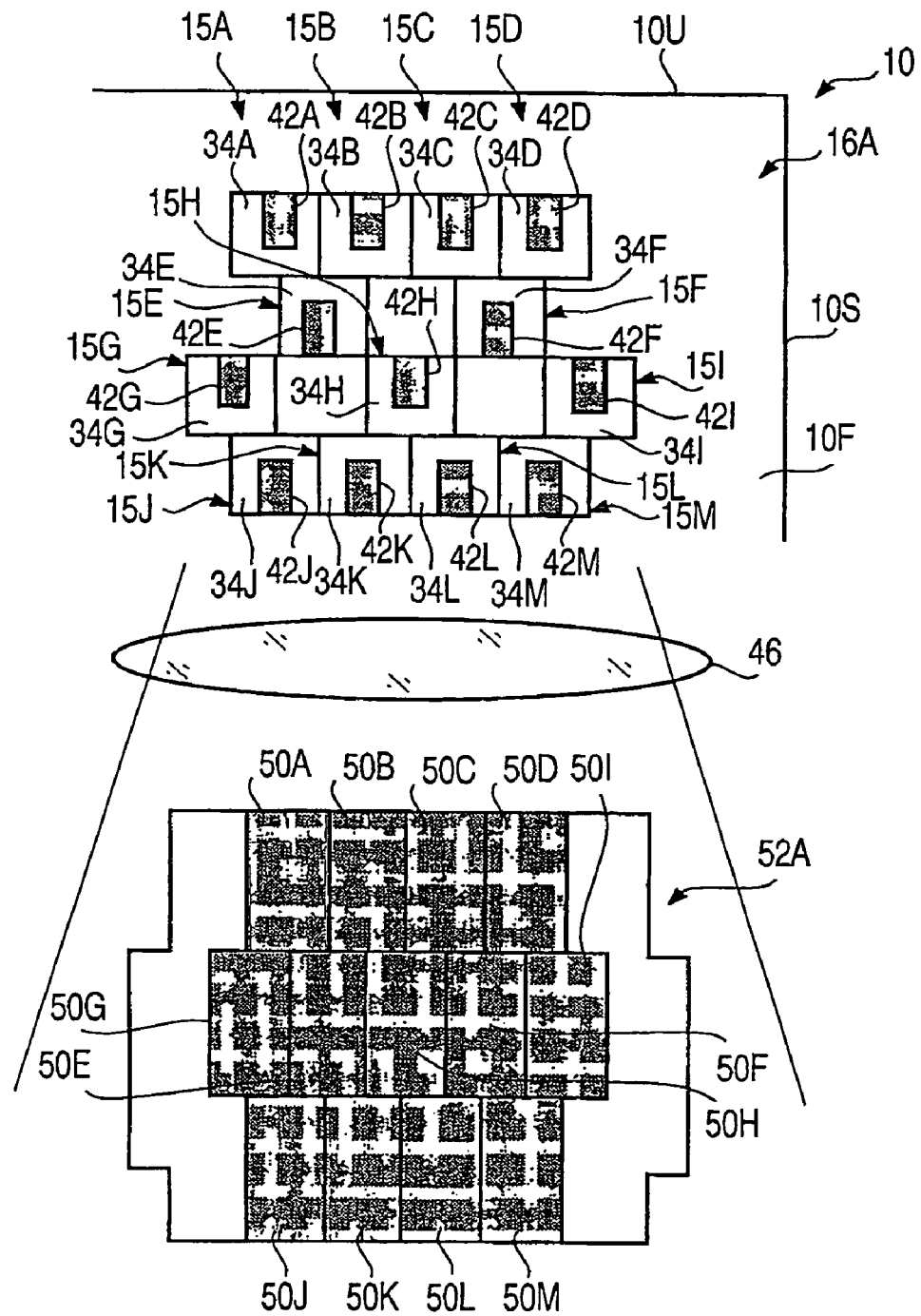
FIG. 5 is an illustration schematically showing the illuminating device and the area illuminated by the illuminating device, according to a first embodiment.

FIG. 5 is an illustration schematically showing an illuminating device 16A including a plurality of light source units 15 and the area illuminated by the illuminating device 16A, according to a first embodiment.

The illuminating device 16A is located on the front face 10F of the digital camera 10 (Ref. FIG. 1), and includes a first to a thirteenth light source units 15A to 15M. FIG. 5 only shows a first to a thirteenth light-emitting surfaces 34A to 34M, included in the first to the thirteenth light source units 15A to 15M respectively. The light-emitting surfaces 34A to 34M respectively include a first to a thirteenth rectangular shaded sections 42A to 42M created by a part of the wire disposed in the light source units so as to block the emitted light, and a first to a thirteenth effective lighting portions, which the emitted light can pass through without being blocked. The first to the thirteenth shaded sections 42A to 42M all have an identical shape that is generally rectangular, and the center point of the light-emitting surfaces 34A to 34M is located inside the first to the thirteenth shaded sections 42A to 42M. Also, the illuminating device 16A is provided with a projection lens 46 that diffuses and adjusts the optical path of the light emitted by all the light source units 15A to 15M.

The first to the thirteenth light source units 15A to 15M are arranged so as to constitute a first to a fourth rows, each of which is elongated in parallel to the upper face 10U of the digital camera 10, i.e. in a horizontal direction. The first light source unit 15A to the fourth light source unit 15D included in the first row will be defined as a first light source group. The fifth and the sixth light source units 15E, F constituting a second light source group are included in the second row; the seventh to the ninth light source units 15G to 15I constituting a third light source group are included in the third row; and the tenth to the thirteenth light source units 15J to 15M constituting a fourth light source group are included in the fourth row.

In the first and the fourth light source groups, the light source units are adjacently arranged to each other, while in the second and the third light source groups the light source units are disposed at an interval that is the same as a length of a side of the outline of the light-emitting surfaces. The first to the thirteenth shaded sections 42A to 42M respectively included in the first to the thirteenth light source units 15A to 15M are oriented such that the short side thereof becomes parallel to the upper face 10U of the digital camera 10. The first to the fourth shaded sections 42A to 42D in the first light source group and the seventh to the ninth shaded sections 42G to 42I in the third light source group are located in an upper portion of the respective light source units. The fifth and the sixth shaded sections 42E, 42F in the second light source group and the tenth to the thirteenth shaded sections 42J to 42M in the fourth light source group are located in a lower portion of the respective light source units. In other words, the shaded sections in each of the first and the fourth light source groups are arranged in parallel with sides of a perimeter of the illuminating device 16A.

The fifth and the sixth light source units 15E, F of the second light source group are arranged such that the fifth and the sixth shaded sections 42E, F are respectively located right under the center point between the first and the second shaded sections 42A, 42B and right under the center point between the third and the fourth shaded sections 42C, 42D, which are mutually adjacent among the first to the fourth shaded sections 42A to 42D of the first light source group included in the first row. The eighth light source unit 15H of the third light source group is arranged such that the eighth shaded section 42H is located right under the center point between the fifth and the sixth shaded sections 42E, F, which are disposed at a predetermined interval in the second row. The seventh and the ninth light source units 15G, 15I of the third light source group are arranged such that an interval between the seventh shaded section 42G and the eighth shaded section 42H, and between the eighth shaded section 42H and the ninth shaded section 42I becomes equal to an interval between the fifth and the sixth shaded sections 42E, F. In the fourth row, the tenth to the thirteenth light source units 15J to 15M of the fourth light source group are arranged such that the tenth to the thirteenth shaded sections 42J to 42M are located right under the first to the fourth shaded sections 42A to 42D, respectively.

Arranging thus the first to the thirteenth shaded sections 42A to 42M results in disposing the first to the thirteenth unilluminated areas 50A to 50M, which are shadows created by all the shaded sections 42A to 42M, so as to be adjacent to one another without overlapping, in the illuminated area 52A produced by the illuminating device 16A. Consequently, the first to the thirteenth unilluminated areas 50A to 50M are uniformly distributed substantially over an entirety of the illuminated area 52A, thus achieving uniform illumination on the illuminated area 52A.

The fifth to the ninth light source units 15E to 15I are oriented to be alternately opposite by 180 degrees. Here, the fifth and the sixth shaded sections 42E, 42F may be located in an upper portion of the corresponding light source units, and the seventh to the ninth shaded sections 42G to 42I may be located in a lower portion of the corresponding light source units. Such arrangement also results in disposing the fifth to the ninth light source units 15E to 15I such that the first to the thirteenth unilluminated areas 50A to 50M are substantially uniformly distributed over the illuminated area 52A.

According to the first embodiment, the first to the thirteenth unilluminated areas 50A to 50M are adjacently disposed without overlapping, by locating the first to the fourth shaded sections 42A to 42D of the first light source group in an upper portion, the tenth to the thirteenth shaded sections 42J to 42M of the fourth light source group in a lower portion, and the fifth to the ninth shaded sections 42E to 42I located between the first and the fourth light source groups alternately in an upper and lower portion. This achieves the illuminating device 16A that illuminates an entirety of the illuminated area 52A with a substantially uniform luminance.

Second Embodiment

Figure 6:
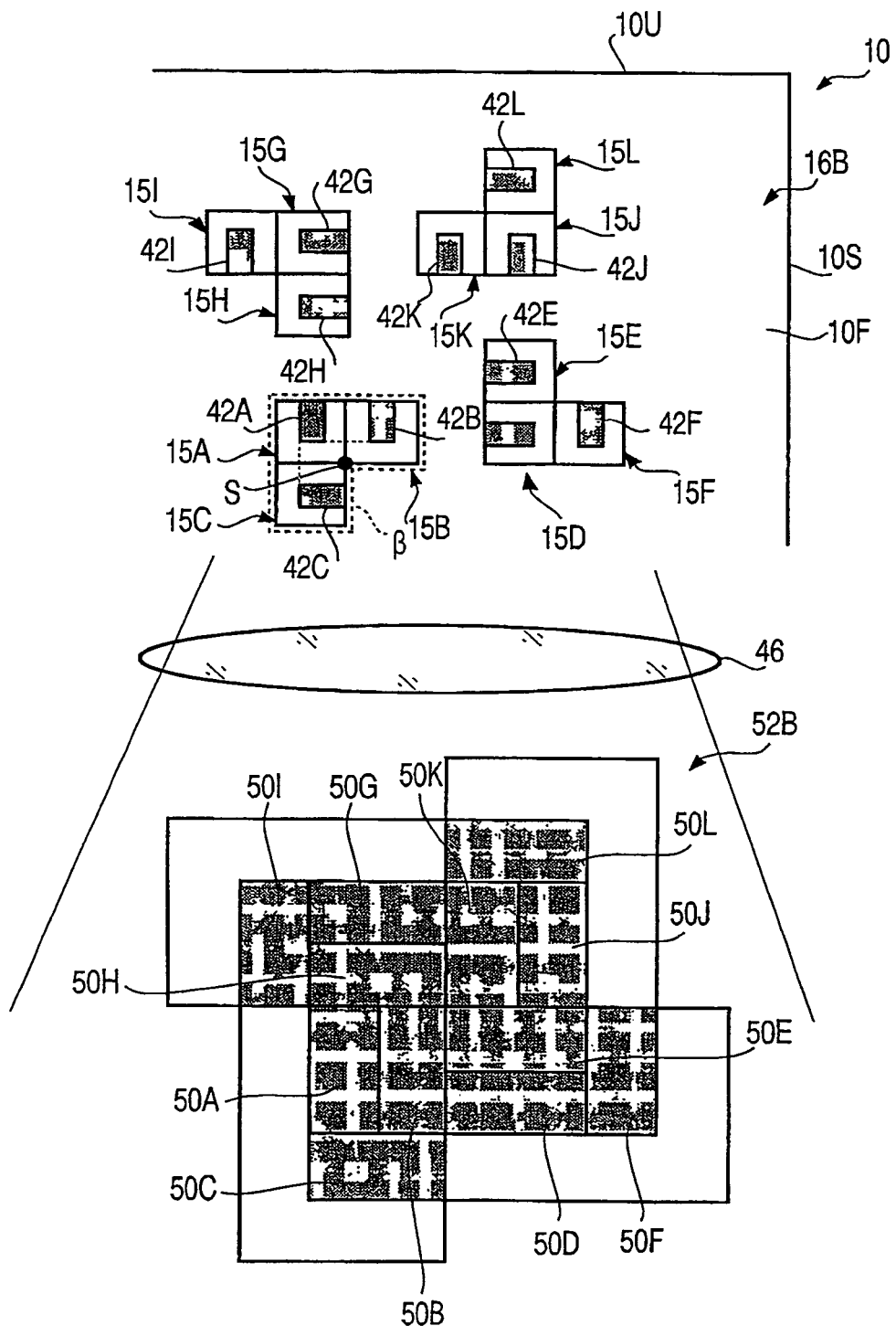
FIG. 6 is an illustration schematically showing the illuminating device and the area illuminated by the illuminating device according to a second embodiment.

FIG. 6 is an illustration schematically showing an illuminating device 16B and an area 52B illuminated by the illuminating device according to a second embodiment, in which the same constituents as those of the first embodiment are given an identical numeral. The following passage mainly covers differences from the first embodiment.

According to the second embodiment, the illuminating device 16B includes a first to a twelfth light source units 15A to 15L. Among them, the first light source unit 15A, and the second and the third light source units 15B, 15C adjacent thereto will be defined as a first light source group. The fourth to the sixth light source units 15D to 15F, similarly oriented to the light source units 15A to 15C so as to constitute a second light source group, are located on the right of the first light source group, while the seventh to the ninth light source units 15G to 15I, also similarly oriented so as to constitute a third light source group, are located above the first light source group. The tenth to the twelfth light source units 15J to 15L, again similarly oriented so as to constitute a fourth light source group are located above the second light source group.

The first light source unit 15A and the second light source unit 15B in the first light source group are disposed adjacent to each other, such that the short sides of the rectangular outline of the first shaded section 42A are aligned with those of the second shaded section 42B. The third light source unit 15C is disposed adjacent to the first light source unit 15A, such that a first short side of the outline of the third shaded section 42C is aligned with the long side of the outline of the first shaded section 42A farther from the second shaded section 42B, and such that an extension of a second short side thereof passes the center point between the first shaded section 42A and the second shaded section 42B. Here, the short sides of the first and the second shaded sections 15A, 15B and the long sides of the third shaded section 15C are parallel to the upper face 10U of the digital camera 10.

The first to the third shaded sections 42A to 42C are evenly distributed in a well-balanced manner over the first light emitting section β constituted of the first light source group. Specifically, the vertical length of the first shaded section 42A, i.e. the length of the long sides of the outline thereof, is equal to the distance between the first shaded section 42A and the second shaded section 42B, and between the first shaded section 42A and the third shaded section 42C. Also, the shortest distance between the light source groups is equal to the length of the sides of the outline of the light-emitting surfaces, and a central region of the illuminating device 16B where the light source group is not located has an area equal to four light-emitting surfaces of the light source unit.

Such arrangement of the first to the third shaded sections 42A to 42C achieves the adjacent positioning, yet without overlapping one another, of the first to the third unilluminated areas 50A to 50C, created by the first to the third shaded sections 42A to 42C upon lighting. Consequently, the first light source group can provide a substantially uniform luminance over an entirety of the corresponding illuminated area.

The orientation of the fourth to the sixth shaded sections 42D to 42F in the second light source group is the same as that of the first to the third shaded sections 42A to 42C turned counterclockwise by 90 degrees around the point S in the first light emitting section β. The orientation of the seventh to the ninth shaded sections 42G to 42I in the third light source group is the same as that of the first to the third shaded sections 42A to 42C turned clockwise by 90 degrees around the point S. Likewise, the orientation of the tenth to the twelfth shaded sections 42J to 42L in the fourth light source group is the same as that of the first to the third shaded sections 42A to 42C turned by 180 degrees around the point S. Accordingly, the positional relationship among the three shaded sections is practically the same, with regard to all the light source groups.

Therefore, the fourth to the sixth unilluminated areas 50D to 50F, created by the fourth to the sixth shaded sections 42D to 42F upon lighting, are adjacently disposed without overlapping one another. Consequently, the second light source group can provide a substantially uniform luminance over an entirety of the corresponding illuminated area. This is also the case with the third and the fourth light source groups.

Arranging thus the light source groups in such a combination that does not cause overlapping or separation of the unilluminated areas results in a uniform distribution of the first to the twelfth unilluminated areas 50A to 50L substantially over an entirety of the illuminated area 52B created by the illuminating device 16B, thereby achieving uniform illumination on the illuminated area 52B.

According to the second embodiment, the three shaded sections are evenly distributed in a light source group constituted of three mutually adjacent light source units, and four such light source groups are arranged in a balanced combination, thus to constitute the illuminating device 16 that can provide a substantially uniform luminance over an entirety of the illuminated area.

Third Embodiment

Figure 7:
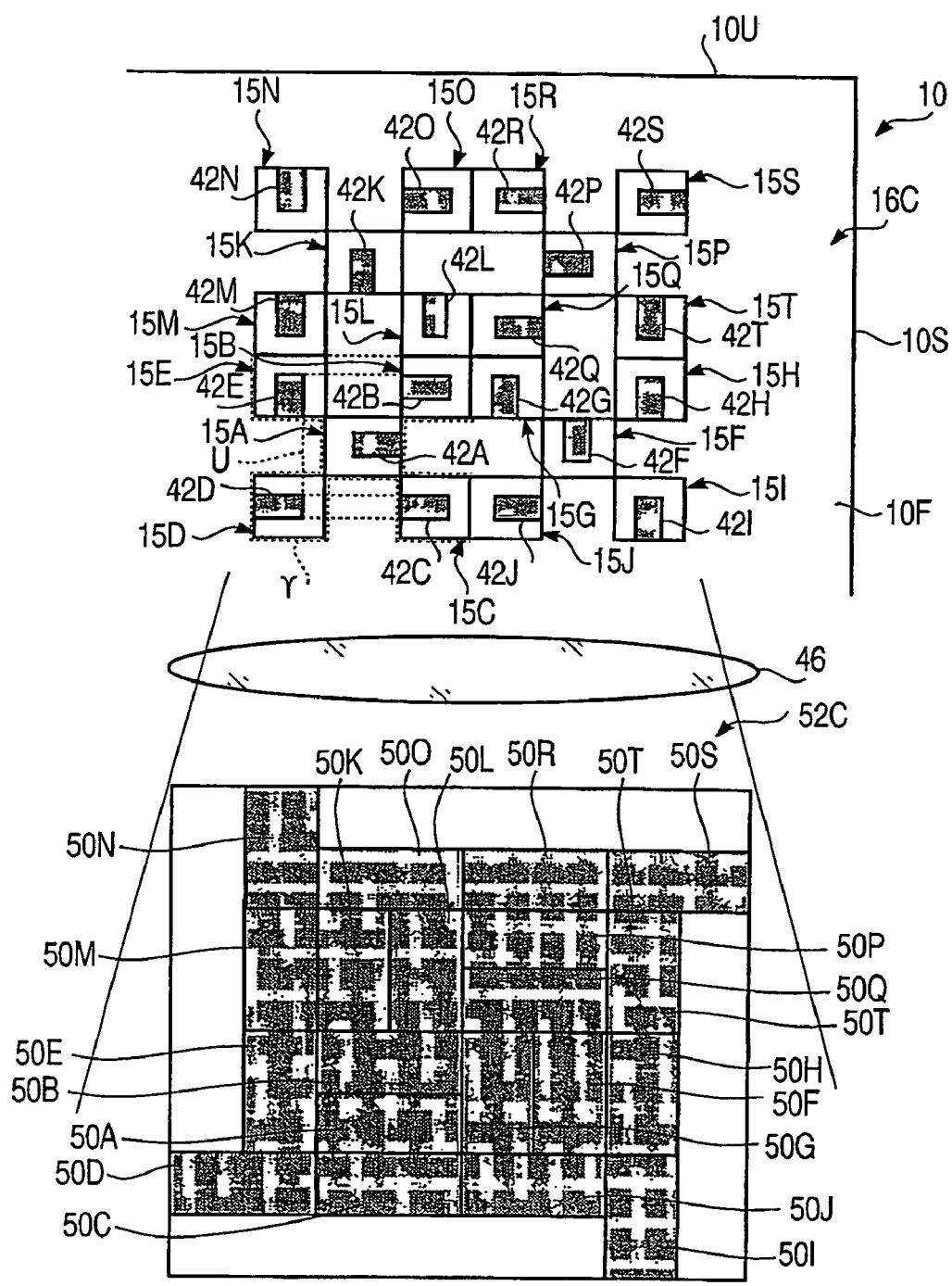
FIG. 7 is an illustration schematically showing the illuminating device and the area illuminated by the illuminating device according to a third embodiment.

FIG. 7 is an illustration schematically showing an illuminating device 16C and an area 52C illuminated by the illuminating device according to a third embodiment, in which the same constituents as those of the first and the second embodiments are given an identical numeral. The following passage mainly covers differences from the first embodiment.

According to the third embodiment, the illuminating device 16C includes a first to a twentieth light source units 15A to 15T. Among them, the first to the fifth light source units 15A to 15E will be defined as a first light source group. The sixth to the tenth light source units 15F to 15J, similarly oriented to the light source units 15A to 15E so as to constitute a second light source group, are located on the right of the first light source group, while the eleventh to the fifteenth light source units 15K to 15O, also similarly oriented so as to constitute a third light source group, are located above the first light source group. The sixteenth to the twentieth light source units 15P to 15T, again similarly oriented so as to constitute a fourth light source group, are located above the second light source group.

The first light source unit 15A is oriented such that the first shaded section 42A thereof is located on a central portion of a second light emitting section γ constituted of the first light source group. The second to the fifth light source units 15B to 15E are oriented such that the corresponding second to the fifth shaded sections 42B to 42E are located around the first shaded section 42A. The second light source unit 15B and the third light source unit 15C are disposed such that the long sides of the outline of the second shaded section 42B become parallel to those of the outline of the first shaded section 42A, and the short sides of the outline of the second shaded section 42B are aligned with those of the outline of the third shaded section 42C. The fourth light source unit 15D and the fifth light source unit 15E are disposed such that the long sides of the outline of the fourth shaded section 42D are aligned with those of the outline of the third shaded section 42C; the long side of the outline of the fifth shaded section 42E closer to a center point of the light emitting section γ is aligned on the straight line U with the short side of the outline of the fourth shaded section 42D closer to the center point; and the short side of the outline of the fifth shaded section 42E farther from the center point is aligned with the long side of the outline of the second shaded section 42B farther from the center point.

The first to the fifth shaded sections 42A to 42E are evenly distributed in a well-balanced manner over the second light emitting section γ. Specifically, the distance between the first shaded section 42A and the second shaded section 42B is equal to the distance between the first shaded section 42A and the third shaded section 42C, as well as to the length of the long sides of the outline of the shaded sections 42A to 42T. The distance from a straight line U connecting the short side of the fourth shaded section 42D and the long side of the fifth shaded section 42E to the first shaded section 42A is also equal to the length of the long sides of the outline of the shaded sections 42A to 42T. Also, with respect to the mutually adjacent light source groups, a portion of the light source units facing a boundary between the light source groups is in contact with each other. Specifically, the second light source unit 15B, the seventh light source unit 15G, the twelfth light source unit 15L and the seventeenth light source unit 15Q are adjacent to one another in the central portion of the illuminating device 16C and further, for example, the third light source unit 15C and the tenth light source unit 15J are in mutual contact, with respect to the first light source group and the second light source group.

Such arrangement of the first to the fifth shaded sections 42A to 42E achieves the adjacent positioning, yet without overlapping one another, of the first to the fifth unilluminated areas 50A to 50E, created by the first to the fifth shaded sections 42A to 42E upon lighting. Consequently, the first light source group can provide a substantially uniform luminance over an entirety of the illuminated area.

The orientation of the sixth to the tenth shaded sections 42F to 42J in the second light source group is the same as that of the first to the fifth shaded sections 42A to 42E turned counterclockwise by 90 degrees. The orientation of the eleventh to the fifteenth shaded sections 42K to 42O in the third light source group is the same as that of the first to the fifth shaded sections 42A to 42E turned clockwise by 90 degrees. Likewise, the orientation of the sixteenth to the twentieth shaded sections 42P to 42T in the fourth light source group is the same as that of the first to the fifth shaded sections 42A to 42E turned by 180 degrees. Accordingly, the positional relationship among the five shaded sections is practically the same, with regard to all the light source groups.

Therefore, the sixth to the tenth unilluminated areas 50F to 50J, created by the sixth to the tenth shaded sections 42F to 42J upon lighting, are adjacently disposed without overlapping one another. Consequently, the second light source group can provide a substantially uniform luminance over an entirety of the corresponding illuminated area. This is also the case with the third and the fourth light source groups.

Arranging thus the light source groups in such a combination that does not cause overlapping or separation of the unilluminated areas results in a uniform distribution of the first to the twentieth unilluminated areas 50A to 50T substantially over an entirety of the illuminated area 52C created by the illuminating device 16C, thereby achieving uniform illumination on the illuminated area 52C.

Figure 8:
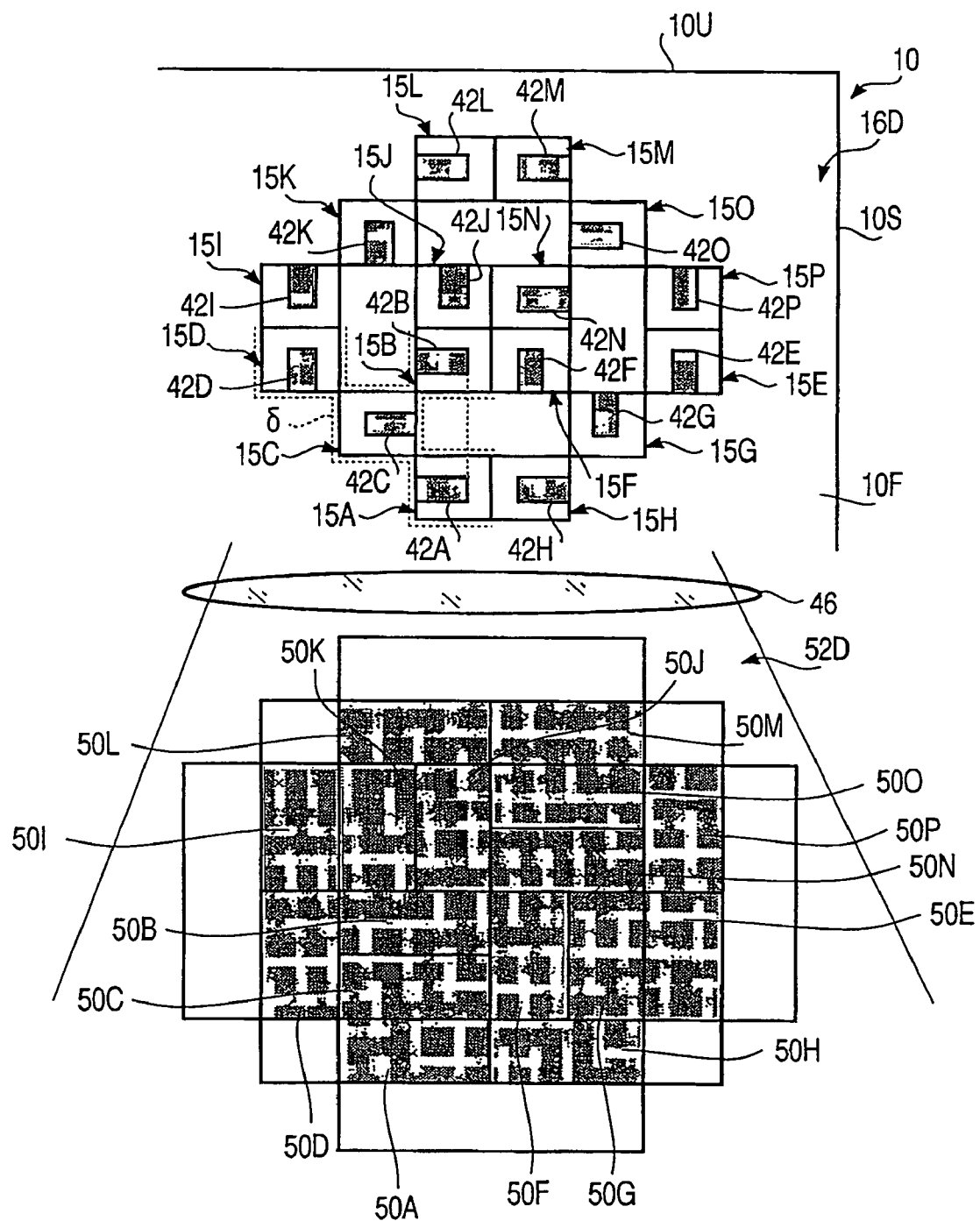
FIG. 8 is an illustration schematically showing the illuminating device and the area illuminated by the illuminating device according to a fourth embodiment.

According to the third embodiment, the five shaded sections are evenly distributed in each light source group constituted of five mutually adjacent light source units, and four such light source groups are arranged in a balanced combination, thus to constitute the illuminating device 16C that can provide a substantially uniform luminance over an entirety of the illuminated area Fourth Embodiment FIG. 8 is an illustration schematically showing an illuminating device 16D and an area 52D illuminated by the illuminating device according to a fourth embodiment, in which the same constituents as those of the first to the third embodiments are given an identical numeral. The following passage mainly covers differences from the first embodiment.

According to the fourth embodiment, the illuminating device 16D includes a first to a sixteenth light source units 15A to 15P. Among them, the first to the fourth light source units 15A to 15D will be defined as a first light source group. The fifth to the eighth light source units 15E to 15H constituting a second light source group are located on the right of the first light source group, while the ninth to the twelfth light source units 15I to 15L constituting a third light source group are located above the first light source group. The thirteenth to the sixteenth light source units 15M to 15P constituting a fourth light source group are located above the second light source group.

The first to the third light source units 15A to 15C are oriented such that the corresponding first to third shaded sections 42A to 42C are located as follows. The short sides of the outline of the first shaded section 42A are respectively aligned with those of the outline of the second shaded section 42B; the long sides of the outline of the third shaded section 42C are parallel to those of the first shaded section 42A; and the center of the third shaded section 42C falls on a straight line that passes the center point between the first shaded section 42A and the second shaded section 42B in parallel to the long side of the first shaded section 42A. The fourth light source unit 15D is disposed such that a first short side of the outline of the fourth shaded section 42D is aligned with a straight line that passes the center point between the second shaded section 42B and the third shaded section 42C in parallel to the long side of the second shaded section 42B, and a second short side the fourth shaded section 42D is aligned with the long side of the outline of the second shaded section 42B. Here, the long sides of the first to the third shaded sections 42A to 42C and the short sides of the fourth shaded section 42D are parallel to the upper face 10U of the digital camera 10.

The first to the fourth shaded sections 42A to 42D are evenly distributed in a well-balanced manner over a third light emitting section δ. Specifically, the distance between the first shaded section 42A and the third shaded section 42C is equal to the distance between the second shaded section 42B and the third shaded section 42C, as well as to the length of the long sides of the outline of the shaded sections 42A to 42P. Also, the distance between an extension of the long side of the outline of the fourth shaded section 42D closer to the first shaded section 42A and the short side of the third shaded section 42C closer to the fourth shaded section 42D is equal to the length of the long sides of the outline of the shaded sections 42A to 42P.

Such arrangement of the first to the fourth shaded section 42A to 42D achieves the adjacent positioning, yet without overlapping one another, of the first to the fourth unilluminated areas 50A to 50D, created by the first to the fourth shaded sections 42A to 42D upon lighting. Consequently, the first light source group can provide a substantially uniform luminance over an entirety of the illuminated area.

Further, the orientation of the shaded sections in the second to the fourth light source groups according to the fourth embodiment is the same as that employed in the second and the third embodiments, i.e. the orientation made by turning the first to the fourth shaded sections. Accordingly, the positional relationship among the four shaded sections is practically the same, with respect to all the light source groups. Consequently, all the light source groups can provide a substantially uniform luminance over an entirety of the respective illuminated area.

Arranging thus the light source groups in such a combination that does not cause overlapping or separation of the unilluminated areas results in a uniform distribution of the first to the sixteenth unilluminated areas 50A to 50P substantially over an entirety of the illuminated area 52 created by the illuminating device 16D, thereby achieving uniform illumination on the illuminated area 52.

According to the fourth embodiment, the four light source units are disposed such that the four shaded sections are evenly distributed in a well-balanced manner, so as to constitute a light source group that substantially uniformly distributes the unilluminated areas in the illuminated area. Further, the light source groups are arranged in such a combination that does not cause overlapping or separation of the unilluminated areas, so as to constitute the illuminating device 16. This results in an uniform distribution of the first to the sixteenth unilluminated areas 50A to 50P substantially over an entirety of the illuminated area 52 created by the illuminating device 16, thereby achieving uniform illumination on the illuminated area 52.

As described above, according to the fourth embodiment the first to the sixteenth light source units 15A to 15P are disposed such that the first to the sixteenth unilluminated areas 50A to 15P are evenly distributed without overlapping or separation over an entirety of the illuminated area 52D, to thereby constitute the illuminating device 16 that provides an uniform luminance on the illuminated area 52D.

The arrangement of the light source units constituting the illuminating device 16 is not specifically limited to those described in each of the foregoing embodiments, provided that the light source units are evenly distributed over an entirety of the illuminated area upon lighting. For example, the orientation of the light source units described in each embodiment may be rotated around the center point of the illuminating device, and the distance between the shaded sections may be uniformly modified.

Also, the number of light source groups to constitute the illuminating device, as well as the number of light source units to constitute a light source group are not specifically limited to those described in the embodiments. For example, the number of light source units constituting the light source groups may be increased or decreased in the first embodiment, and the number of light source groups may be increased or decreased in the second to the fourth embodiments, so as to modify the size of the illuminated area.

The light source is not limited to a semiconductor light emitting device (LED). The present invention can be applied to various type of light emitting devices configured such that a portion of emitted light is blocked.

The shape of the light-emitting surface of the light source units is not limited to a rectangular shape, but may also be a circular or polygonal shape. Irrespective of a shape of the light emitting section, disposing the light source units so as to evenly distribute the unilluminated area allows providing a substantially uniform luminance.

The illuminating device 16 may be incorporated in a silver-halide film camera or a mobile apparatus provided with a photoshooting function. Further, the illuminating device 16 may be built as an independent device to be removably attached to a photoshooting apparatus instead of integrally incorporating therein, to be controlled via control signals from the photoshooting apparatus.

The present disclosure relates to the subject matter contained in Japanese Patent Application No. 2004-110984, filed on Apr. 5, 2004, which is expressly incorporated herein by reference in its entirety.

What is claimed is:

1. An illuminating device, comprising a plurality of light source units, each of the plurality of light source units including:

a light emitting unit having a light emitting device;

a first optical system that adjusts an optical path of light emitted from the light emitting unit;

an electrode that supplies power to the light emitting unit; and a connecting element that connects the light emitting unit to the electrode and is disposed so as to block a part of the optical path of light from the light emitting unit thus to create an unilluminated area in a region otherwise illuminated by the light emitting unit, wherein the plurality of light source units are arranged such that unilluminated areas of the plurality of light source units are substantially uniformly distributed over the regions otherwise illuminated by the plurality of light source units;

wherein the light emitting unit is provided with a light-emitting surface including a substantially rectangular shaded region created by the connecting element blocking the light;

wherein light emitting units of the plurality of light source units have substantially the same shape and are arranged in parallel with a horizontal direction in four rows including first, second third and fourth rows;

wherein, in the first row, the light source units are arranged such that all of the shaded regions are located in upper portions thereof;

wherein, in the second row, the light source units are arranged such that all of the shaded regions are located in lower portions thereof and at regular intervals from one another, and at least one of the shaded regions in the second row is located right under a center between adjacent shaded regions of the first row;

wherein, in the third row, the light source units are arranged such that all of the shaded regions are located in upper portions thereof and at regular intervals from one another, and at least one of the shaded regions in the third row is located right under a center between adjacent shaded regions of the second row; and wherein, in the fourth row, the light source units are arranged such that all of the shaded regions are located in lower portions thereof, and right under the shaded regions of the first row.

2. The illuminating device according to claim 1, wherein the first optical system serves as an optical path diffuser that diffuses the light from the light emitting unit.

3. The illuminating device according to claim 1, wherein the connecting element is a wire for supplying power from the electrode to the light emitting unit.

4. The illuminating device according to claim 1, wherein the light emitting device is a semiconductor light emitting device.

5. An illuminating device, comprising a plurality of light source units, each of the plurality of light source units including:

a light emitting unit having a light emitting device;

a first optical system that adjusts an optical path of light emitted from the light emitting unit;

an electrode that supplies power to the light emitting unit; and a connecting element that connects the light emitting unit to the electrode and is disposed so as to block a part of the optical path of light from the light emitting unit thus to create an unilluminated area in a region otherwise illuminated by the light emitting unit, wherein the plurality of light source units are arranged such that unilluminated areas of the plurality of light source units are substantially uniformly distributed over the regions otherwise illuminated by the plurality of light source units;

wherein the plurality of light source units are divided into at least one light source group including three light source units of an identical shape;

wherein the light emitting unit is provided with a light-emitting surface including a substantially rectangular shaded region created by the connecting element blocking the light;

wherein center points of light-emitting surfaces of the plurality of light source units are located within shaded regions of the respective light-emitting surfaces;

wherein the three light source units in the at least one light source group are arranged such that short sides of an outline of a first shaded region are generally aligned with short sides of an outline of a second shaded region, a long side of the outline of the first shaded region opposite to the second shaded region is substantially aligned with a first short side of an outline of the third shaded region, and wherein an extension of a second short side of the outline of the third shaded region passes a center point between the first shaded region and the second shaded region.

6. The illuminating device according to claim 5, wherein the at least one light source group comprises a plurality of the light source groups.

7. The illuminating device according to claim 5, wherein the first optical system serves as an optical path diffuser that diffuses the light from the light emitting unit.

8. The illuminating device according to claim 5, wherein the connecting element is a wire for supplying power from the electrode to the light emitting unit.

9. An illuminating device, comprising a plurality of light source units, each of the plurality of light source units including:

a light emitting unit having a light emitting device;

a first optical system that adjusts an optical path of light emitted from the light emitting unit;

an electrode that supplies power to the light emitting unit; and a connecting element that connects the light emitting unit to the electrode and is disposed so as to block a part of the optical path of light from the light emitting unit thus to create an unilluminated area in a region otherwise illuminated by the light emitting unit, wherein the plurality of light source units are arranged such that unilluminated areas of the plurality of light source units are substantially uniformly distributed over the regions otherwise illuminated by the plurality of light source units;

wherein the plurality of light source units are divided into at least one light source group including five light source units of an identical shape and forming a light emitting section;

wherein the light emitting unit is provided with a light-emitting surface including a substantially rectangular shaded region created by the connecting element blocking the light;

wherein center points of light-emitting surfaces of the plurality of light source units are located within shaded regions of the respective light-emitting surfaces; and wherein the five light source units in the at least one light source group are arranged:

such that a first shaded region is located generally at a center of the light emitting section, and second, third, fourth and fifth shaded regions are located around the first shaded region;

such that long sides of an outline of a second shaded region are substantially parallel to long sides of an outline of the first shaded region;

such that short sides of the outline of the second shaded region are substantially aligned with short sides of an outline of the third shaded region;

such that long sides of an outline of the fourth shaded region are substantially aligned with long sides of the outline of the third shaded region;

such that a long side of an outline of the fifth shaded region closer to the center of the light emitting section is substantially aligned with a short side of the outline of the fourth shaded region closer to the center of the light emitting section; and such that a short side of the outline of the fifth shaded region farther from the center of the light emitting section is substantially aligned with a long side of the outline of the second shaded region farther from the center of the light emitting section.

10. The illuminating device according to claim 9, wherein the at least one light source group comprises a plurality of the light source groups.

11. The illuminating device according to claim 9, wherein the first optical system serves as an optical path diffuser that diffuses the light from the light emitting unit.

12. The illuminating device according to claim 9, wherein the connecting element is a wire for supplying power from the electrode to the light emitting unit.

13. An illuminating device, comprising a plurality of light source units, each of the plurality of light source units including:
- a light emitting unit having a light emitting device;
- a first optical system that adjusts an optical path of light emitted from the light emitting unit;
- an electrode that supplies power to the light emitting unit; and
- a connecting element that connects the light emitting unit to the electrode and is disposed so as to block a part of the optical path of light from the light emitting unit thus to create an unilluminated area in a region otherwise illuminated by the light emitting unit, wherein the plurality of light source units are arranged such that unilluminated areas of the plurality of light source units are substantially uniformly distributed over the regions otherwise illuminated by the plurality of light source units;

wherein the plurality of light source units are divided into at least one light source group including four light source units of an identical shape and forming a light emitting section;

wherein the light emitting unit is provided with a light-emitting surface including a substantially rectangular shaded region created by the connecting element blocking the light;

wherein center points of light-emitting surfaces of the plurality of light source units are located within shaded regions of the respective light-emitting surfaces; and wherein the four light source units in the at least one light source group are arranged:

such that short sides of an outline of a first shaded region are substantially aligned with short sides of an outline of a second shaded region;

such that long sides of an outline of a third shaded region are substantially parallel to long sides of the outline the first shaded region, and a center of the third shaded region falls on a straight line that passes a center point between the first shaded region and the second shaded region substantially in parallel to a long side of the outline of the first shaded region; and such that a first short side of an outline of a fourth shaded region falls on a straight line that passes a center point between the second shaded region and the third shaded region substantially in parallel to long sides of the outline of the second shaded region, and a second short side of the outline of the fourth shaded region is substantially aligned with a long side of the outline of the second shaded region.

14. The illuminating device according to claim 13, wherein the at least one light source group comprises a plurality of the light source groups.

15. The illuminating device according to claim 13, wherein the first optical system serves as an optical path diffuser that diffuses the light from the light emitting unit.

16. The illuminating device according to claim 13, wherein the connecting element is a wire for supplying power from the electrode to the light emitting unit.

* * * * *